United States Patent [19]

Southworth et al.

[11] 3,842,894

[45] Oct. 22, 1974

[54] AUTOMATIC MEANS FOR REMOTE SWEEP-SCANNING OF A LIQUID LEVEL AND FOR CONTROLLING FLOW TO MAINTAIN SUCH LEVEL

[75] Inventors: Glen R. Southworth, Boulder, Colo.; Peter M. Robbins, Patagonia, Ariz.; Frank Wills, Mattituck, N.Y.

[73] Assignee: American Metal Climax, Inc., New York, N.Y.

[22] Filed: Jan. 17, 1973

[21] Appl. No.: 324,321

[52] U.S. Cl. .......................... 164/4, 164/82, 164/154
[51] Int. Cl. ........................................... B22d 17/32
[58] Field of Search ............... 164/4, 82, 154, 155; 73/290, 293; 178/DIG. 1, 7.1

[56] References Cited
UNITED STATES PATENTS

| | | | |
|---|---|---|---|
| 2,246,907 | 6/1941 | Webster | 164/155 |
| 2,573,006 | 10/1951 | Good | 73/293 |
| 2,937,234 | 5/1960 | Whitehead | 178/DIG. 1 |
| 3,459,949 | 8/1969 | Poncet | 73/290 X |
| 3,478,808 | 11/1969 | Adams | 164/4 |
| 3,521,696 | 7/1970 | Lowman et al. | 164/154 |
| 3,537,505 | 11/1970 | Thalmann et al. | 164/155 X |
| 3,715,485 | 2/1973 | Weimer | 178/7.1 |
| 3,749,830 | 7/1973 | Blitchington, Jr. | 178/DIG. 1 |

Primary Examiner—R. Spencer Annear
Attorney, Agent, or Firm—Kasper T. Serijan; Roy C. Hopgood

[57] ABSTRACT

The invention contemplates liquid-level control through remote use of a radiation-responsive electrical device optically imaged at a limited region of adjacency between the liquid and a retaining wall, and scanning this region to detect departures from a norm or from a predetermined program of deviation from the norm, the departures being used to correctively adjust flow to maintain a preselected level. The device, described in the context of monitoring a continuous casting of metal, includes a display of a larger field in which the limited region of liquid-level scanning is also presented, and selectively adjustable means are provided for positioning the limited region within the field, and for displaying the levels at which safety devices come into play to transfer to manual control, without interruption of continuity of flow or casting, in the event that automatic regulation fails to maintain the predetermined level.

24 Claims, 5 Drawing Figures

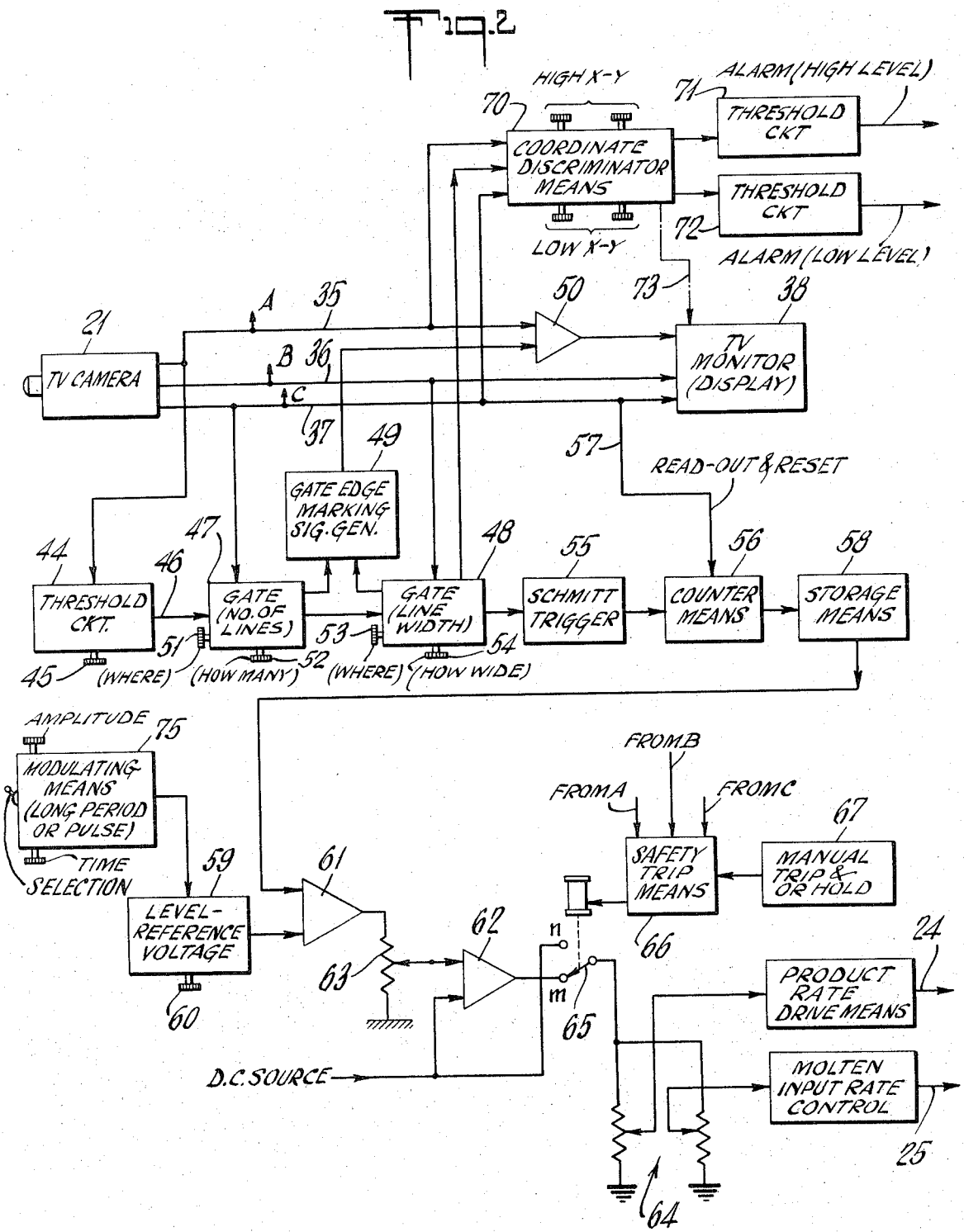

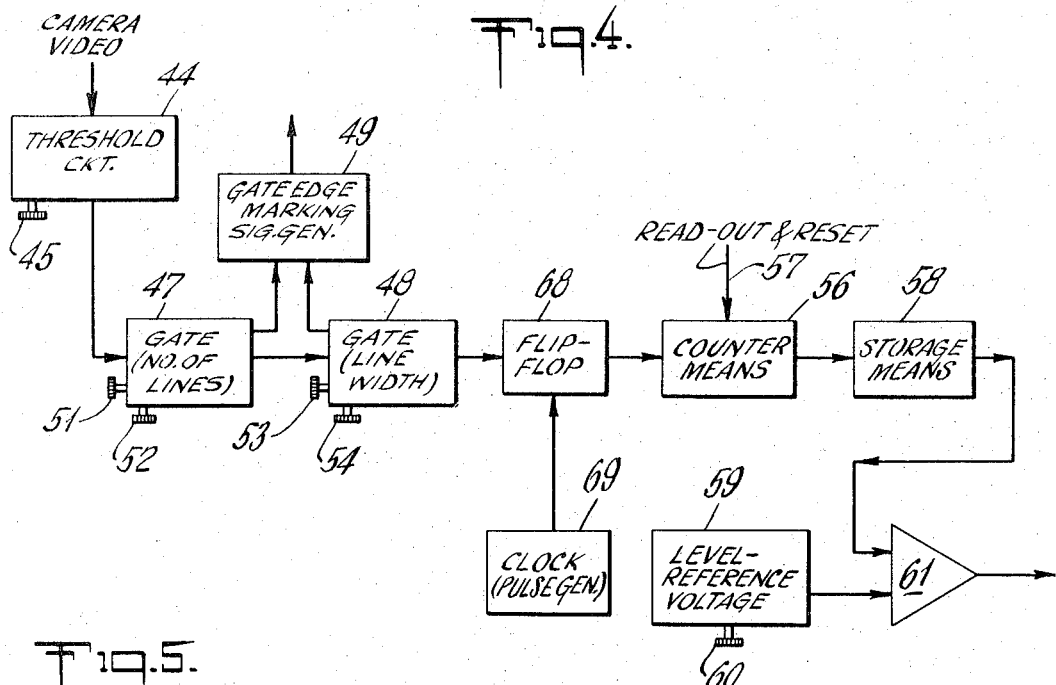
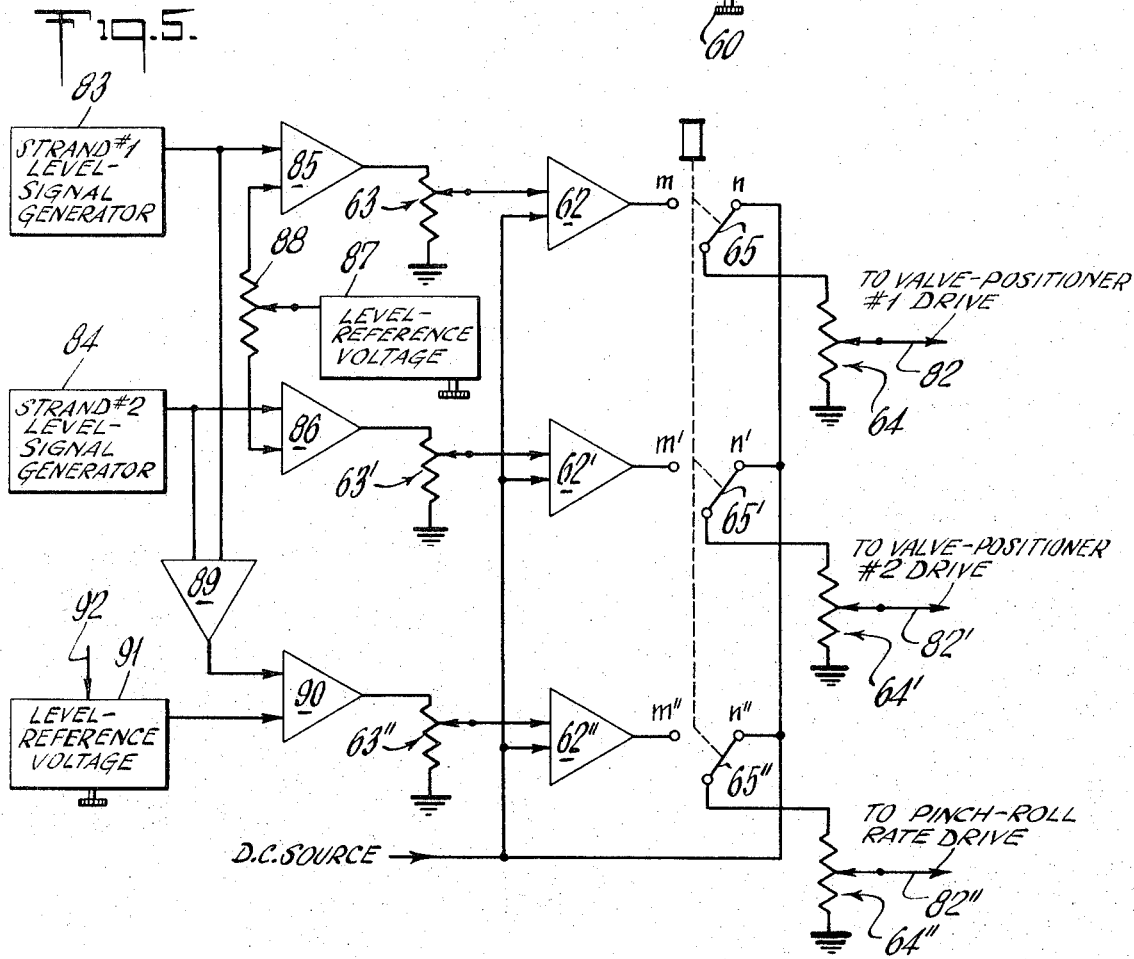

AUTOMATIC MEANS FOR REMOTE SWEEP-SCANNING OF A LIQUID LEVEL AND FOR CONTROLLING FLOW TO MAINTAIN SUCH LEVEL

This invention relates to a method and means for automatically maintaining a desired liquid level or program of liquid levels, as in a metal-casting environment. In such casting, molten metal is continuously or semi-continuously supplied to the upper open end of an upstanding mold from which cast product issues via the open lower end of the mold. The invention has application in a variety of liquid-level control environments but will be specifically described in the context of such control of molten metal in the vertical-axis casting of rod, bar or strand product, as of copper.

In continuous-casting of a metal such as copper, molten material is continuously supplied to the upper open end of an upstanding hollow mold of sufficient length to enable the solid phase to develop prior to discharge of molded product via the lower open end. High temperatures and the need to maintain purity and consistency of product dictate that there shall be no physical contact between mold contents and any instrumentation used to monitor and control the rate of material flow through the mold. These considerations apply whether the molding operation is one of strictly continuous casting, or of somewhat continuous casting, as for example wherein successively indexible mold cavities are to be sequentially supplied with molten metal. The use of the expression "continuous" in the present specification will be understood to apply to liquid-level monitoring and control, whether in the context of such strictly continuous, semi-continuous, or intermittently indexed operation.

It is an object of the invention to provide an improved method and means of the character indicated.

Another object is to provide improved liquid-level monitoring and control in a continuous casting of metal products, the control being such as to achieve economies and to produce a superior and more consistent product.

A specific object is to achieve the foregoing objects using portable apparatus featuring ease of set up, and observation remote from the monitored region.

Another specific object is to achieve the above objects with television techniques which enable visual monitoring of a relatively large view of the liquid and adjacent mold wall, coordinated with a display of the more restricted region relied upon for achievement of automatic regulation.

Another specific object is to so achieve the foregoing objects that there can also be inherently longer useful life for the mold itself.

A further specific object is to achieve the above objects in the concurrent casting of plural metal products in different molds served by the same source of molten metal.

Other objects and various further features of novelty and invention will be pointed out or will occur to those skilled in the art from a reading of the following specification, in conjunction with the accompanying drawings.

In said drawings, which show, for illustrative purposes only, preferred embodiments of the invention:

FIG. 2 is an electrical block diagram providing further detail for the level control means of FIG. 1;

FIG. 4 is a block diagram depicting slight modification in the circuit of FIG. 2; and FIG. 5 is a block diagram showing application of the invention to a situation in which plural molds are served by the same source of molten metal.

Figure 1:
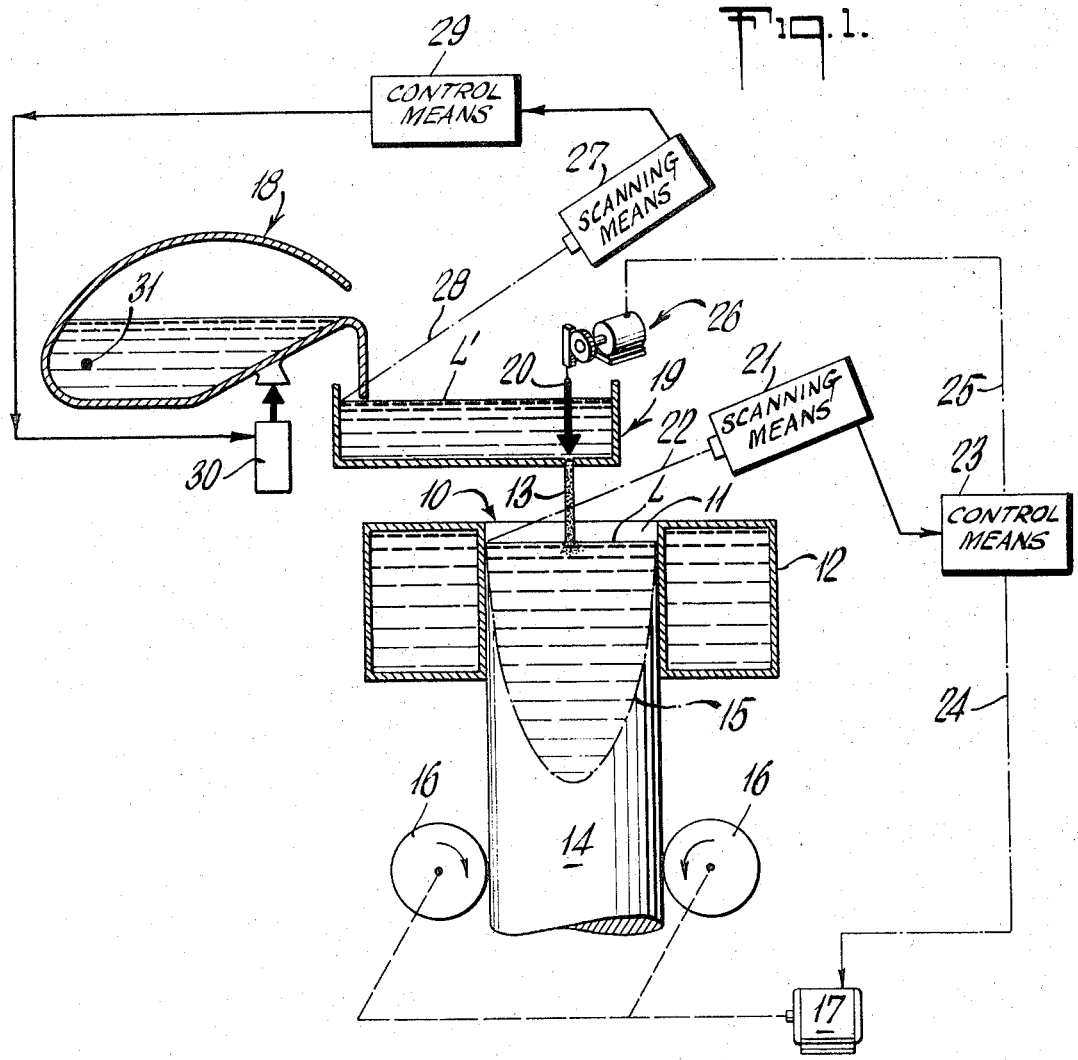
FIG. 1 is a simplified diagram schematically showing mechanical, optical and electrical elements of our level control, in application to the continuous casting of a metal bar or strand.

Referring first to FIG. 1, the invention is shown in application to a continuous-casting mold 10 comprising an upstanding cylindrical mold wall 11 surrounded by an annular jacket 12 for the application of a cooling medium, such as water circulated by means not shown. Molten metal, e.g., molten copper, enters as a stream 13 via the upper open end of the mold 10, achieving a liquid level L. Below the level L, the solid phase of the strand or bar product 14 develops, with an internal liquid-solid interface profile suggested at 15. As shown, pinch rolls 16, driven by electric motor means 17, provide a controlled rate of product extraction from the mold 10. Also, as shown, molten metal poured from a suitable melting furnace (not shown) is received in an eccentric holding furnace 18, from which it pours into an intermediate reservoir or tundish 19, and the latter is equipped with valve means such as a carbon rod 20 controlling the flow in stream 13.

Figure 3:
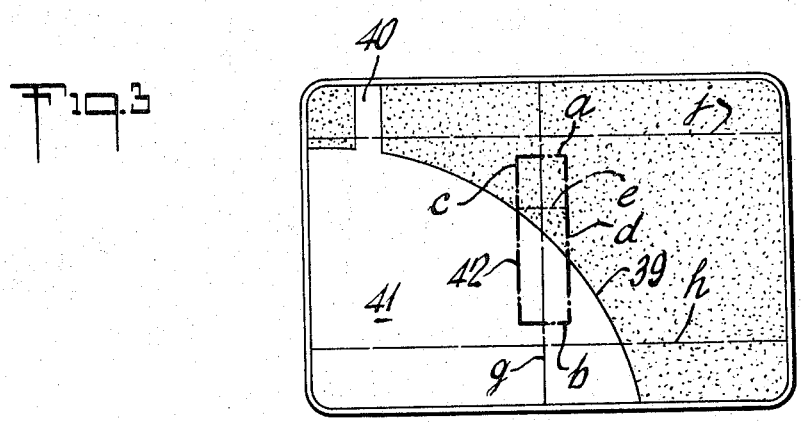
FIG. 3 is a diagram depicting a monitor display, using apparatus of FIGS. 1 and 2.

The control means of the invention is only generally shown in FIG. 1, and reference is made to FIGS. 2 and 3 for greater detail as to components and operation. Basically, scanning means 21, which may be a television-type scanner having an optical axis 22, is movably mounted, as on a tripod, external to the molding operation and aligned to view the surface L in the context of adjacent mold wall surface 11. The output of scanning means 21 is connected to control means 23 with an output 24 governing motor 17 and, therefore, the rate of product extraction; alternatively or additionally, an output 25 of control means 23 may operate a motor positioner 26 for the valve means 20, the sense of operative control of motors 17 and 26 being such as to maintain a predetermined liquid level L.

In analogous fashion, a second such scanning means 27 is aligned on a downwardly slanted axis 28 to view the tundish liquid level L'; and control means 29 governs the extent to which means 30 is actuated to adjust furnish tilt about its horizontal pivot axis 31, all to the end that the predetermined liquid level L' is automatically maintained.

Turning now to FIG. 2, the TV camera 21, which is preferably of the variety employing a silicon-diode array tube (Tivicon), is shown with conventional closed-circuit video and synchronizing line connections 35-36-37 to a monitoring display 38; the scanning and display of the field may involve a conventional rectangular raster of vertically progressed horizontal line scans. FIG. 3 shows that for the preferred orientation of the viewing axis 22, the visually monitored field will generally span a quadrant of the outer edge 39 of the liquid surface L, so that the bright area of the display is characterized by the image 40 of the molten stream 13, adjoining the image 41 of the molten pool (level L). Darkened regions outside the areas 40-41 represent the images of adjacent mold wall 11 and other background, all in clear recognizable contrast along the intersection line 39.

Superposed on the display is a rectangle 42 representing the limited region within which level L is monitored by automatic means to be described. The rendering of rectangle 42 in the display may involve known techniques for display of adequate intensity or color contrast, as will be understood.

Specifically, the automatic control circuitry is shown to comprise a threshold circuit 44 operatively connected to the video output line 35 and adjustably variable at 45 so as pass only signals of sufficient intensity to be indicative of the molten metal alone. The thus-selected and characterized video signal is fed via an output line 46 to a two-coordinate gate system 47-48 having output connections to gate-edge marking-signal generating means 49, for supplying the signals to delineate the area 42 in the display; the gate-edge marking signals are shown added to the scanned video signals in line 35, at suitable amplifier means 50, prior to supply to display 38. The gate 47 operates from a frame-synchronizing line (37) connection and includes first adjustable means 51 for selecting "where" the gate shall be located vertically in the display (FIG. 3) and second adjustable means 52 for selecting "how many" lines shall be used to determine the vertical span of the gate; adjustments at 51-52 thus determine the vertical position and vertical spread between upper and lower limits a-b of the area 42 in the display. In similar fashion, the gate 48 operates from a line-synchronizing line (36) connection and includes first adjustable means 53 for selecting where the gate shall be located horizontally in the display and second adjustable means 54 for selecting "how wide" a time segment of each scan line shall be, to determine horizontal span of the gate; adjustments at 53-54 thus determine the horizontal position and horizontal width between lateral limits c-d of the area 42 in the display.

Such video-signal output of threshold circuit 44 as passes both gates 47-48 is passed to a Schmitt-trigger circuit 55 so that as long as any video signal exceeding threshold is encountered upon entry of a line scan into the gate margin, a maximum-amplitude square wave will be generated for the full selected gate width. Thus, for an assumed case of left-to-right horizontal scan action, and of vertically-down scan depression of successive line scans, there will be no Schmitt-trigger action at 55 until the first line scan (at elevation e in the display area 42) encounters a hot signal, due to detached intersection of gate-margin line c with the molten-metal profile 39; thereafter, for each line scan at vertical levels from e down to b, similar Schmitt-trigger square-wave pulses will be generated. For each raster scan, a counter 56 develops a signal indicative of the count of Schmitt-trigger pulses, and a frame-synchronizing connection 57 suggests that the count value at 56 is read out to a storage device 58 and that counter means 56 is reset, at the end of each raster and in readiness for a new count in the course of the next raster development. The currently stored voltage level at 58 will thus be understood to be indicative of the currently observed instantaneous molten-surface elevation L.

The current level-indicating voltage output of means 58 is, in the form shown, comparatively evaluated against a reference-voltage level from a suitable source 59 having manual means 60 for selecting the control point for level L. Comparison is achieved in a differential amplifier 61 which is connected for response to the measured and reference voltage outputs of means 58-59, respectively. A second amplifier 62 is shown as a means for selecting the level of control voltage available to drive appropriate productrate and molten-input-rate circuits to lines 24-25, respectively, relying on adjustable voltage-divider taps at 63-64 in the respective coupling connections shown. The armature 65 of a safety-trip relay (to be described below) has a normal connection to its control contact m as shown, so that the described automatic regulation of level L may proceed; however, if one of the conditions is met for operation of armature 65 by safety-trip means 66, the control circuit is closed at contact n for direct drive by the d-c source which powers amplifier 62, the direction of drive being to continue flow of stream 13 and the drive of the product-drive motor 17, all in accordance with values manually set at 64. As shown, an operator can trip or hold the safety means 66, through suitable manually operated means 67; also, the legends "From A", "From B" and "From C" will be understood to indicate fail-safe trip-actuating devices monitoring the basic video and synchronizing output lines 35-36-37 (at A, B, C) to assure operation of trip means 66 in the event of failure or other detected malfunction in any of these lines.

To complete the description of FIG. 2, the circuit provides automatic alarm indication, in the event of detection of level L rise above a tolerable upper limit, or drop below a tolerable lower limit. The single block 70 will be understood to suggest appropriate coordinate-responsive discriminator means, whereby detection at a first threshold circuit 71 of a signal exceeding threshold (i.e., detection of a molten-metal indicative signal in an upper-level coordinate gate) will signify alarm condition of the level L, and whereby detection at a second threshold circuit 72 of a signal below threshold (i.e., detection of loss of molten-metal indicative signal in a lower-level coordinate gate) will signify the alarm condition of too low an elevation of the molten-metal surface L. Thus, discriminator means 70 may have input connections to the basic output lines 35-36-37 from the TV camera, in which case, means 70 will be understood to include means operated by the line-synchronizing signals to generate a central vertical coordinate alignment g; however, as shown, the means 70 includes an input connection to gate 48, whereby the line width for which the lower and upper safety alarm levels h-j (FIG. 3) are operative is that determined by projection of the vertical margins c-d in the display. Manual adjustments labeled "High X-Y" and "Low X-Y" will be understood to enable adjustment of the coordinate locations in the display for which the respective high-level and low-level alarm threshold circuits are operative at 71-72.

In operation, the described circuit will be seen to automatically maintain the level L in accordance with the desired elevation determined by preselection of a reference voltage at 60. To maintain this level, it is not necessary to have a full field or any other display at 38 (as in FIG. 3), but the use of a field display enables an operator to accurately adjust the two-component gate for area 42, preferably in a manner to define a fairly sharp slope (e.g., 30 to 60 degrees) for insertion of contour 39 with that margin of area 42 for which line scans commence their traverse of area 42. Additionally, the operator can observe the fidelity with which level L is maintained, and an output connection 73 (from discriminator means 70 to display 38) suggests that the selected alarm-coordinate line h-j (and, if desired, g) can also be superposed on the display.

As a further feature of the invention, it is found that product quality will not be deleteriously affected by small changes in level L, and at the same time it is found that such small changes on a relatively slow basis will materially extend the useful life of a given mold wall 11, by breaking the marginal encrustations of copper which unavoidably accumulate and attach to the wall 11. In the handling of molten copper in a chromium-plated mold wall of 0.008-inch plate thickness, a useful mold-wall life of 2 to 3 production days can be more than doubled by the periodic programmed modulation of small changes in the controlled level L. In FIG. 2, the block 75 designates such programmed modulating means, having manual adjustment at 76-77, respectively, for selection of period and amplitude of the modulation. The modulation output signal is connected to the reference-voltage source 59 and thus is operative as an undulating or pulsed change in the reference-voltage level. Such modulation is not needed on a continuous basis but at periodic intervals, say, once or twice a day, for 15 minutes, to produce five cycles of undulation (3-minute periods).

The discussion thus far has been concerned with use of conventional TV raster-scan techniques and with the selective control of gating of the TV output to achieve the desired level monitoring and control functions. These techniques have used horizontal-line scanning, but the invention is equally applicable to the 90-degree-rotated situation involving vertical-line scanning, with horizontally displaced successive lines to complete the raster. In general, it is preferred that the two-component gate means be then adjusted to establish a level-monitoring area (42) which is essentially a selected length of one vertical-line scan in each raster; the selected line may correspond to the central vertical line $g$ in FIG. 3, gate-limited as to length, as for example between the $a$ and $b$ intercepts of line $g$ in FIG. 3. In the slightly modified circuit of FIG. 4, adjustment 51 is thus manipulated to select a central vertical alignment, with adjustment 52 set to select a single vertical line scan; similarly, adjustments at 53-54 are made to assure that the line selected for gating shall also be selected for its upper and lower limits in the monitored field. Such video signal as passes the threshold circuit 44 and gates 47-48 will then determine a square wave of length dependent upon the instantaneously observed interception of level L on the gated vertical scan line, and we show use of a flip-flop circuit to operate as a further gate 68 of clock pulses from a generator 69 to the counter means 56, so that the voltage output of storage means 58 may always be indicative of observed level L. Comparison with the predetermined reference, and control of the indicated drive means, may be as previously described, as suggested by connections to amplifier means 61.

FIG. 5 illustrates a further employment of the invention in a situation in which continuously cast products (Strand No. 1 and Strand No. 2) are being cast in separate molds, each served by a different stream (13) and by different valve means (20) from the same tundish (19); in FIG. 5, the separate valve means (20) and positioning means (26) therefor will be understood to be suggested by descriptive legends applied to separate control-signal outputs 80-81, to the drives for valve-positioner No. 1 and valve-positioner No. 2 (corresponding to the separate molds served thereby, for strands No. 1 and No. 2), respectively. At the same time, a single control-signal output 82 to the pinch-roll rate drives means will be understood to serve both the separate means (16-17) extracting the respective strand No. 1 and No. 2 products at the same rate.

More specifically, in FIG. 5, the liquid level in each of the plural molds (for strands No. 1 and No. 2) is monitored by a separate camera 21 and level-signal generating circuitry, as described in connection with FIG. 1, up to the output of storage means 58; such separate sets of components will be understood to be designated by the blocks 83-84 in FIG. 5. Thus, the level signal provided at 83 to differential amplifier 85 is the current output of a storage circuit (58) responding to a first level observation in the mold for strand No. 1, while the level signal provided at 84 to differential amplifier 86 is the current output of a different storage circuit (58) responding to a second level observation in the mold for strand No. 2. Both amplifiers 85-86 derive their level-reference voltage inputs from common reference, indicated at 87 as being variable, for selection of desired level-monitoring and control action, and a balancing-potentiometer connection 88 is adjusted (as a set-up procedure), to maintain balance. Output signals separately available from amplifiers 85-86 are separately processed and fed to the respective valve-positioner drive outputs 80-81, using components already described and therefore given the same reference numerals (with primed notation for the case of strand No. 2 control). For pinch-roll rate drive control via connection 82, a summation amplifier 89 provides an output signal reflecting the current addition of level-observation voltages available from storage circuits (58) in the two generators 83-84. The summation signal is presented to a differential amplifier 90 for continuous evaluation against a suitably adjusted level-reference voltage provided at 91, and subsequent handling of control-signal development (to output 82) is provided by previously described components, identified by double-prime notation in FIG. 5; it will also be understood that in FIG. 5, the cycling voltage control to prevent wear of chrome plating on the molds for both strands may be introduced at a control input 92 to reference means 91, in the manner described for modulating means 75 and its relation to reference means 59 in FIG. 1. Also as in FIG. 1, the occurrence of a system malfunction in FIG. 5 will be operative to trip the safety relay (with its respective contact arms 65-65'-65''), causing all circuits to close over the manual contacts $n$-$n'$-$n''$, and thus establishing valve-positioner drives in accordance with manual control at 64-64', with the pinch-roll rate drive tracking the setting of manual control at 64''.

The invention will be seen to have achieved all stated objects using relatively simple, readily available components, with minor modifications. The result is a readily portable monitoring and sighting system, relatively easy to set up and to safely and accurately observe in operation. The camera unit 21 will always be selected with a response appropriate for the desired observable intensity contrast, a silicon-diode array tube (Tivicon) being indicated as preferred for copper casting; such a tube exhibits high reliability, and avoids "third image" and "burn-in" problems. Intensity contrast may be further enhanced by selection of light filters to reduce infrared response and to engage ultraviolet response. The automatic features of the invention reduce labor requirements to the simplest supervision, enabling a single man to monitor simultaneous production of a relatively large number of strands in different molds. The products of the control of the invention exhibits improved consistency, and mold life is substantially prolonged. Alarm situations are quickly brought to attention, so that production can continue under purely manual control or other measures may be taken to avoid loss of or minimize damage to the product and/or the equipment.

While the invention has been described for the preferred forms shown, it will be understood that modifications may be made without departing from the scope of the invention.

What is claimed is:

1. The method of using a radiation-responsive device to automatically control level of molten material in an upstanding tubular mold open at upper and lower ends, said device having means regulating supply of molten material to the upper end of the mold and extraction of molded product from the lower end of the mold, which method comprises scanning with said radiation-responsive device a selected generally vertically extending and laterally restricted field comprehending only a limited fraction of molten-material surface and adjacent mold-wall surface, such scan being from a fixed location external to and offset from the mold, the scan including a generally vertical recurrent sweep of radiation selected in a spectral-response region for which the molten material and adjacent mold-wall surface produce contrasting levels of electrical signal in said device, whereby an electrical-signal change will occur for each sweep at a time in the sweep reflecting instantaneous level of molten material, utilizing said signal change to generate an electrical control signal indicative of the time in the sweep at which signal change occurs, and utilizing said control signal and therefore the observed time in the sweep to impart a corrective adjustment of said regulating means.

2. The method of claim 1, in which the corrective adjustment is used to vary the rate of product extraction.

3. The method of claim 1, in which the corrective adjustment is used to vary the rate of supply of molten material to the mold.

4. Continuous-casting apparatus, comprising a vertically oriented mold having a mold wall open at both upper and lower ends, a molten-material supply source including means regulating a continuous supply of molten material to the upper end of said mold, continuously driven product-extraction means beneath the lower end of the mold and regulating the rate of extraction of molded product, and a fixedly mounted electro-optical system connected to one of said means and continuously generating and supplying to said one means a rate-controlling electrical signal, said electro-optical system comprising a scanner oriented to scan a selected generally vertically extending and laterally restricted field comprehending only a limited fraction of molten-material surface and adjacent wall surface, the scan including a generally vertical recurrent sweep of radiation selected in a spectral-response region for which the molten material and adjacent mold-wall surface produce contrasting levels of electrical signal, and means responsive to change in level of said contrasting-level signal for generating an electrical control signal indicative of the time in the sweep at which signal-level change occurs, and means utilizing said control signal in the supply of said rate-controlling electrical signal.

5. Apparatus according to claim 4, in which said last-defined means includes means responding to a change in that time within the sweep period at which the contrasting-level signal changes from one to another contrasting level.

6. Apparatus according to claim 4, in which said system includes a TV camera positioned to scan said restricted field.

7. Apparatus according to claim 6, in which said TV camera is oriented to develop a raster of vertically spaced horizontal-line scans, said last-defined means including means responsive to the number of lines-per-frame at which one of the contrasting levels is observed.

8. Apparatus according to claim 6, in which said TV camera is oriented to develop a raster of laterally spaced vertical-line scans, said last-defined means including means responsive to the time in a given vertical line at which transition occurs from one to the other of the contrasting levels.

9. Apparatus according to claim 6, in which the TV camera includes a silicon-diode array tube.

10. Apparatus according to claim 6, in which optical filtering is applied to said camera to optimize contrast in video-signal level corresponding to the respective adjacent surfaces.

11. Apparatus according to claim 6, in which said camera has a field of view substantially larger than said restricted field, and in which said system includes gate means operative on the electrical output of said camera to limit to said restricted field the TV-scanned output supplied to said last-defined means.

12. Apparatus according to claim 11, in which said gate means includes means for selectively adjusting the effective horizontal and vertical extent and location thereof.

13. Apparatus according to claim 11, in which said system includes a TV display monitor of the entire field of said camera, and mark-generator means responsive to said gate means and connected to said monitor for indicating on the monitor the relative size and location of the restricted field.

14. Apparatus according to claim 11, including an alarm device operative to indicate an excessively high molten-material level, said device comprising threshold means observing the level of camera video output, said threshold means being set to respond to onset of a level of video signal attributable only to molten material, vertically selectively variable gating means connected to the electrical synchronizing-signal output of said camera to determine an alarm-monitoring vertically high region of the field, said gating and threshold means being conjointly connected and operative to produce the high-level alarm when the threshold condition is achieved within the gated vertically high region of the field.

15. Apparatus according to claim 11, including an alarm device operative to indicate an excessively low molten-material level, said device comprising threshold means observing the level of camera video output, said threshold means being set to respond to onset of a reduced level of video signal attributable only to absence of molten material, vertically selectively variable gating means connected to the electrical synchronizing-signal output of said camera to determine an alarm-monitoring vertically low region of the field, said gating and threshold means being conjointly connected and operative to produce the low-level alarm when the threshold condition is achieved within the gated vertically low region of the field.

16. Apparatus according to claim 7, in which said restricted field is limited to a slant aspect of one remote side of the mold wall and adjacent molten material, whereby for a given instantaneous level of molten material the line of intersection between the molten-material surface and the adjacent wall traverses said field along a generally sloping course so that certain horizontal scans will develop a video signal having portions at each of said contrasting levels, and signal-generating means effectively converting the video signal to one only of said levels if that one level occurs during any part of the particular line scan.

17. Apparatus according to claim 4, in which said last-defined means includes a source of reference-signal voltage, and means comparing said contrasting-level signal with said reference-signal voltage.

18. Apparatus according to claim 17, and including selectively variable means for controlling said source of reference-signal voltage.

19. Apparatus according to claim 17, and including modulating means connected to said source and having a cyclic period very substantially exceeding the period of said scanner and operative to periodically modulate the level of reference-signal voltage delivered by said source.

20. Apparatus according to claim 19, in which said modulating means includes means for selectively varying the amplitude of modulation of said reference-signal voltage.

21. Apparatus according to claim 19, in which said modulating means includes means for selectively varying the period of modulation of said reference-signal voltage.

22. Apparatus according to claim 4, in which said mold is one of two such molds and in which said molten-material supply source includes separately controllable means regulating separate continuous supplies of molten material to the respective molds, said electro-optical system being one of two each of which generates a rate-controlling electrical signal for observation of liquid level in a different one of said molds, said electrical signals being respectively connected for supply to said separately controllable means, and reference-voltage means connected in common to the separate contrasting-level responsive means in the respective electro-optical systems.

23. Apparatus according to claim 22, wherein said last-defined means includes a balanced connection to the respective contrasting-level responsive means.

24. Apparatus according to claim 22, wherein said product-extraction means is separately provided for each mold, and a common drive control for said respective product-extraction means, said drive control including means summing the output of the respective contrasting-level responsive means.

* * * * *